Patented Feb. 4, 1941

2,230,754

UNITED STATES PATENT OFFICE 2,230,754

UNSATURATED ETHYLAMINE DERIVATIVES

Wilfrid Klavehn, Schwetzingen, and Anton Wolf, Heidelberg, Germany, assignors to E. Bilhuber Corporation No Drawing. Application February 12, 1938, Serial No. 190,329. In Germany February 15, 1937

2 Claims. (Cl. 260—583)

The inventors' American Patent No. 1,972,450 has for its object new derivatives of amino-6-methyl-2-heptene-2, which are characterised by a valuable anti-spasmodic action, and a process for their production. These derivatives were produced by the condensation of methyl-2-heptene-2-one-6 with primary aliphatic amines and subsequent or simultaneous reduction of the condensation products.

This invention relates to other new unsaturated derivatives of ethylamine of the general formula

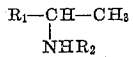

wherein $R_1$ is a lower alkenyl radical selected from the group consisting of straight chained alkenyl radicals containing six carbon atoms and branch chained alkenyl radicals containing six carbon atoms, wherein the branch is upon a hydrogenated carbon atom, and $R_2$ is an alkyl, alkenyl or, cycloalkyl radicle. These compounds also have favourable anti-spasmodic properties.

$R_1$ may, for example, be an ethyl-4-butene-1-yl or a methyl-5-pentene-1-yl radical.

$R_2$ is an alkyl radicle of saturated nature, for example methyl, ethyl, propyl, isopropyl, butyl, isobutyl, amyl, isoamyl etc. or of unsaturated nature, for example allyl, butenyl etc. or a cycloalkyl radicle for example cyclopentyl, cyclohexyl, methylcyclohexyl etc.

The new compounds are produced by condensing an alkenylmethyl ketone of the general formula

with primary amines of the general formula

wherein $R_2$ is an alkyl, alkenyl, or cycloalkyl radicle, and reducing the product. The condensation and the reduction may take place simultaneously or successively.

In carrying out the process the ketones are condensed with alkylamines or alkenylamines, for example methyl, ethyl, propyl, isopropyl, butyl, isobutyl, amyl, isoamyl or allyl or butenylamine. The condensation may also be effected with cycloalkylamines, for example cyclopentyl, cyclohexyl or methylcyclohexylamine. The condensation product obtained is reduced in known manner suitably by nascent hydrogen.

*Examples*

1. 37.8 grams of ethyl-4-hexene-1-one-5,

were dissolved in 300 cc. of 75% alcohol and reduced with 30 grams of activated aluminum in the presence of 12 grams of methylamine. After completion of the reaction, the reaction mixture was decomposed with dilute mineral acid, the alcohol distilled off and the non-basic portion removed with steam. On the addition of alkali, the base present separated as an oil which was steam distilled.

The methylamino-5-ethyl-4-hexene-1, $C_9H_{19}N$ obtained boils under ordinary pressure at 168 to 169° C. The hydrochloride crystallises from alcohol-ether in scales of melting point 135 to 136° C. The yield was 70 to 80% of the theoretical.

2. 37.8 grms. of methyl-5-heptene-1-one-6,

dissolved in 300 ccs. of 75% alcohol was reduced with 30 grms. of activated aluminium in the presence of 12 grms. of methylamine. The working up was carried out in known manner.

The methylamino-6-methyl-5-heptene-1, $C_9H_{19}N$ obtained boils at 172 to 173° C. under ordinary pressure. The base is a colourless mobile oil of weak ammoniacal odour. The yield was 75 to 85% of the theoretical.

The production of the base can also be effected by the reduction of methyl-5-heptene-1-one-6 in the presence of methylamine by means of zinc dust and sulphurous acid.

What we claim is:

1. Unsaturated derivatives of ethyl amine of the general formula

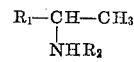

wherein $R_1$ is a lower alkenyl radical selected from the group consisting of straight chained alkenyl radicals having six carbon atoms and branched chained alkenyl radicals having six carbon atoms wherein the branch is upon a hydrogenated carbon atom, and $R_2$ is a radical selected from the group consisting of lower alkyl, lower alkenyl and cycloalkyl radicals.

2. Methylamino-5-ethyl-4-hexene-1.

WILFRID KLAVEHN.
ANTON WOLF.